United States Patent
Yamamoto et al.

(10) Patent No.: US 8,585,853 B2
(45) Date of Patent: Nov. 19, 2013

(54) LAYERED MANUFACTURING METHOD AND LAYERED MANUFACTURING DEVICE

(76) Inventors: Keijirou Yamamoto, Kanagawa (JP); Tsuyoshi Tokunaga, Kanagawa (JP)

( * ) Notice: Subject to any disclaimer, the term of this patent is extended or adjusted under 35 U.S.C. 154(b) by 363 days.

(21) Appl. No.: 13/109,268

(22) Filed: May 17, 2011

(65) Prior Publication Data

US 2011/0285060 A1 Nov. 24, 2011

(30) Foreign Application Priority Data

May 19, 2010 (JP) .................................. 2010-114944

(51) Int. Cl.
*B22F 3/16* (2006.01)
*B22F 3/24* (2006.01)
*B23K 26/42* (2006.01)

(52) U.S. Cl.
USPC ........ 156/264; 156/272.8; 264/241; 264/345; 264/405; 264/497; 425/500; 29/527.1; 419/44; 419/55; 419/66; 219/121.65; 219/121.66; 219/121.86

(58) Field of Classification Search
USPC ............... 156/256, 264, 272.8, 379.8, 379.9; 264/241, 345, 405, 497; 425/500, 425/174.4; 29/527.1; 427/202, 203, 205; 219/121.65, 121.66, 121.86; 419/38, 419/44, 53–55, 66
See application file for complete search history.

(56) References Cited

U.S. PATENT DOCUMENTS

| 5,876,550 | A | * | 3/1999 | Feygin et al. ................. 156/264 |
| 6,649,124 | B2 | * | 11/2003 | Kohara et al. .................. 419/38 |
| 2002/0015654 | A1 | | 2/2002 | Das |
| 2007/0003427 | A1 | * | 1/2007 | Yamamoto et al. ............ 419/66 |
| 2010/0044547 | A1 | | 2/2010 | Higashi |

FOREIGN PATENT DOCUMENTS

| EP | 1 695 778 | 8/2006 |
| JP | 2007-146216 | 6/2007 |
| WO | WO 2005/056221 A1 | 6/2005 |
| WO | 2010-026397 | 3/2010 |

OTHER PUBLICATIONS

European Search Report issued for corresponding European Patent Application No. 11165842.3 dated Aug. 29, 2011.

* cited by examiner

*Primary Examiner* — Samuel M Heinrich
(74) *Attorney, Agent, or Firm* — Kratz, Quintos & Hanson, LLP

(57) ABSTRACT

A layered manufacturing method for forming a desired three-dimensional object by using a powder as a raw material. The method forms a desired solid body, which is employed in a layered manufacturing device, including a stage member having stage surface; a transparent member having an optical window to cover the stage surface to form an enclosed region together with the stage surface; and an exhaust system for exhausting gasses in the enclosed region. The optical window is positioned at a vertical upper direction when the enclosed region is formed.

10 Claims, 10 Drawing Sheets

LAYERED MANUFACTURING METHOD AND LAYERED MANUFACTURING DEVICE

RELATED APPLICATION

This present application is based on, and claims priority from, J.P. Application No. 2010-114944 filed on May 19, 2010, the disclosure of which is hereby incorporated by reference herein in its entirely.

BACKGROUND OF THE INVENTION

The present invention generally relates to a layered manufacturing method and a layered manufacturing device, and more particularly relates to a layered manufacturing method for manufacturing a desired solid object with powder as a raw material, and to a layered manufacturing device using the layered manufacturing method.

BACKGROUND OF INVENTION

Conventionally, the materialization of solid objects for which a drawing has been created using CAD (Computer Aided Design) using rapid prototyping (referred to as RP hereafter) has been performed in various fields. In particular, an RP system using layered manufacturing methods is a simple device and has a high degree of processing freedom compared to a machining center or the like. Layered manufacturing methods having this type of advantage are often applied to objects with resin or paper as a material, but there are problems in terms of strength and deterioration due to aging. For this reason, there has been rapid progress in research into solid body manufacture using layered manufacturing with metal and so forth as a material.

Among such layered manufacturing methods for solid bodies with metal as a material, for methods aimed at a solid object having high strength, there have been proposed (a) a method of manufacturing a solid body by first coating resin on the surface of material powder such as metal, and then sequentially layering cross-sectional elements with resin sections that have been heated and fused by irradiation of laser light made to function as adhesive, and (b) directly heating and fusing powder material such as metal by a first type of laser irradiation, and forming a bulk sample. With this type of method, there is melting of specified regions due to laser irradiation, and congealing arises at the molten sections. However, with only this melting and congealing, cavities and resin remain inside a manufactured solid body, and sufficient strength is not obtained. There has therefore been a need for post processing such as evaporation of the remaining resin components localized bonding of material particles has been promoted in a high temperature atmosphere to achieve a sintered state, or fusing of material having a lower melting point than the used material, such as metal, and penetration into cavity sections; and the improvement of strength is intended with this type of post processing.

In contrast, more recently, there has been proposed a layered manufacturing method that can achieve high strength without the need for post processing such as sintering or using a low melting point material (see, patent document 1: hereafter referred to as "prior art example"). In such method, a plurality of sheet-formed members is prepared by being compressed material powders. Then, an area corresponding to a designed shape on a cross-section of the first sheet-formed member is irradiated with a laser. The melted area is then solidified to form the first cross-sectional element. Subsequently, a surface of the element is leveled.

The element has a leveled upper surface in a vertical direction, on which the next sheet-formed member is placed. Subsequently, the area of new sheet-formed member of which shape corresponds to the designed shape on the cross-section of the sheet-formed member at laminated position new sheet-formed member is irradiated by an illuminating light source to melt the irradiated area. Thereafter, the melted part is solidified to form a laminated cross-sectional surface; and the new cross-sectional element is integrated into the previously manufactured part. Then, the surface of the integrated one is flattened. After that, the lamination of the sheet-formed member, the formation of the manufactured cross-sectional surface, and the leveling of the cross-sectional surface are sequentially repeated.

PRIOR ART

Patent Document

[Patent Document 1] WO 2005/056221 A1

SUMMARY OF THE INVENTION

Problem to be Solved by the Invention

The above-described layered manufacturing method of the prior art example manufactures a solid body with strength. However, in the related art example, since spaces in the sheet-formed member are filled with gas such as air, there is the possibility of causing voids or hollow portions in the sheet-formed member.

In order to decrease the possibility of experiencing the above-noted problem, the prior example requires the finely adjusting of an energy density of the irradiation light and scanning speed in detail by type of the material to be used. Therefore, there is a need to establish a new art for manufacturing a solid body of high strength with the rapid manufacturing, but without fine adjustment.

The present invention has been conceived in view of the above-described situation, and an object of the invention is to provide a layered manufacturing method that can manufacture a solid body of high strength simply and quickly.

Means for Solving the Problems

From the first aspect of the present invention, the layered manufacturing method of the present invention is a layered manufacturing method for forming a desired three dimensional object by using a powder as a raw material for forming a desired solid body, which is employed in a layered manufacturing device comprising a stage member having stage surface; a transparent member having an optical window to cover the stage surface to form an enclosed region together with the stage surface. The optical window is positioned at a vertical upper direction when the enclosed region is formed; and an exhaust system for exhausting gasses in the enclosed region, followed by the repeated execution of the steps of: preparing a plurality of flat plate material members formed by compressing material powder, exhausting the gasses for reducing a pressure so as to produce a pressure difference between an inside and outside of the enclosed region not less than 0.05 MPa; placing a first flat plate material member at a position on a stage surface before the enclosed region is formed, of which position is to be maintained inside of the enclosed region after it is formed; irradiating laser light through the optical window made of the transparent member from the vertical upper direction to a region of an initial one of the flat plate material members to form an initial cross-sectional element that is hardened after locally heating and melting; leveling the vertical upper direction side surface of the initial cross-sectional element in a condition such that the enclosed region is opened; subsequently, placing the flat plate material member as a layered material member at the position on the stage surface before the enclosed region is formed, of which position is to be maintained inside of the enclosed region after it is formed; irradiating laser light through the optical window of the transparent material member from the vertical upper direction to a region of the flat plate material member corresponding to a designed cross-sectional shape of a layered position of the flat plate material member of a desired solid object, to form a layered cross-sectional element that is hardened after locally heating and melting, together with an integration of the vertical upper direction side with a part already formed on an opposite side; and leveling the vertical upper direction side surface of the initial cross-sectional element in the condition that the enclosed region is opened.

In the layered manufacturing method, firstly, a plurality of flat plate material members, which are formed by compressing material powder, are prepared, exhausting the gas for reducing a pressure so as to produce a pressure difference between an inside and outside of the enclosed region not less than 0.05 MPa, in the flat plate material member preparation step. Thus, the obtained flat plate members have a void inside of them; however, each of the members includes a decreased amount of air existing in itself. It is noted that the flat plate member is compressed not so as to be collapsed by its own weight, or by loading on the stage with robot arm and so forth. Furthermore, the powder particles composed of the member are not spread during laser irradiations performed in both of the initial cross-sectional element forming step and a layered cross-sectional element forming step.

Subsequently, in the first flat plate member placing step, the first member is placed on the stage surface at a position under the condition that the transparent member is not put on the stage surface; namely, the enclosed region is not yet formed, but the position of the member that is placed is inside of the region after it is formed. After that, the enclosed region is formed by putting the transparent member on the stage surface and the gasses inside of the enclosed region is exhausted by using the exhaust system.

Next, in the initial cross-sectional element forming step, the laser light is irradiated through the optical window made of the transparent member from the vertical upper direction to a region of an initial one of the flat plate material members to form an initial cross-sectional element, the air inside of the enclosed region being exhausted by the exhaust system. The initial cross-sectional element thus obtained does not have a flat surface in the vertical upper direction side because of surface tension. Therefore, subsequently, the transparent member is taken off from the stage surface to open the enclosed region; and then, the upper vertical side surface is leveled the initial cross-sectional member. Thus, the initial flat plate-shaped member is manufactured at the position to which the next element is layered.

Next, in the flat plate member as a layered material member placing step, the flat plate-shaped member which is layered on the initial flat plate-shaped member under the enclosed region is not formed on the stage surface. The position of the second member is also inside of the enclosed region after it is formed. As a result, the new flat plate-shaped member is placed on the manufactured part of the initial flat-shaped member. By this, the second member is attached to the upper vertical direction surface of the first member. Consequently, the enclosed region is formed by putting the transparent member on the stage surface, and the air in the enclosed region is exhausted by using the exhaust system.

Subsequently, in the cross-sectional element forming step, the laser light is irradiated from the upper vertical direction through the optical window onto the predetermined area on the new flat plate-shaped member. The predetermined area has a shape corresponding to the cross-sectional shape designed to form three dimensional objects. By this, the laser-irradiated area is locally heated and melted. After that, the layered cross-sectional element is formed by congealing the melted part after stopping the irradiation of the laser. At the same time, the layered cross-sectional element is unified to the manufactured part, which is formed at the opposite surface of the laser irradiation.

The vertical upper surface of the thus-formed layered cross-sectional element also is not flat surface because of the surface tension and so forth is the same as that of the initial cross-sectional element as mentioned above. Therefore, the surface of the layered cross-sectional element is leveled in the layered surface leveling step after the transparent member is taken off from the stage surface; that is, the enclosed region formed on the stage surface is opened.

After that, a desired solid body having high strength is formed by sequentially repeating the above-described flat plate material member formation step, layered cross-sectional element formation step and layered surface leveling step. Thus, it is possible to manufacture a solid body with high strength.

In other words, in the layered manufacturing method of the present invention, the flat plate-shaped member before the laser irradiation is formed by compressing the material powder under reduced pressure, the pressure difference between the inside and outside becoming not less than 0.05 MPa. Therefore, although the member has the void in its inside, the amount of the air included in the void is reduced. Further, the flat shaped member is housed in the enclosed region formed on the stage surface, air inside the region is exhausted by the exhaust system to melt and solidify the material at the position corresponding to that of the three dimensional object the interest. By this, a strong three dimensional article may be manufactured without the fine control of the energy density and the scan speed of the irradiated laser light.

Also, the layered manufacturing method of the present invention does not need to form a powder particle layer directly on the part which is made by the layered manufacturing method for forming the cross-sectional element for each layer. Since this means that the layer is not formed on the stage, the stage that can bear large external force is not necessary. Further, this enables the skipping of the step whereby the part already formed by the layered manufacturing method is left from the laser irradiation stage to form the powder particle layer thereon, and then set these to the stage. Furthermore, it also enables the skipping of the step for mutually performing the powder particle compression and laser irradiation in the different step.

Therefore, according to the layered manufacturing method of the present invention, it is possible to manufacture a solid body of high strength simply and quickly.

With the layered manufacturing method of the present invention, it is possible for the porosity of the sheet-formed members, the flat plate material members, to be less than 50%. In this case, the flat-shaped material is not broken up by its own weight or loaded onto a stage using a robot arm and so forth; and it is possible to compress powder material to such an extent that material powder is not scattered as a result of the laser light irradiation in an initial cross-sectional element formation step and layered cross-sectional element formation step, which will be described later. In the case of, for example, pure iron powder with average particle diameter of 100 μm is used as the material powder, it is possible to make a proportion of material powder 50% or more in the member by compression at 100 MPa or greater.

With the layered manufacturing method of the present invention, as the material powder, it is possible to use powdered metals (such as, iron (Fe), titanium (Ti), or nickel (Ni)), or use a powdered alloy (such as, nickel-molybdenum (Ni—Mo) alloy steel). When a Ni—Mo type alloy, which will be described later, is used, it is possible to obtain manufactured products that are high in strength and have excellent wear resistance. Incidentally, metals or alloys other than those mentioned above, can be adopted as material as long as they are metals or alloys that experience a melting and solidification process. Also, polyamide type plastics (such as, nylon), glass (such as, soda glass), and ceramics (such as, zirconia) can also be employed as the material.

Also, with the layered manufacturing method of the present invention, it is possible to choose the respective materials of the flat plate material members depending on respective layer positions of the flat plate material members. In this case, it is possible to manufacture a layer manufactured body with a material having a desired strength according to the position of the layer manufactured body in a layer direction.

The layered manufacturing method of the present invention may further comprise the steps of removing the first excess material, which are not used for forming the first initial cross-sectional element in a condition that formation state of the enclosed region is broken, performed between the steps of forming the initial cross-sectional element and leveling the vertical upper direction side surface; and removing the layered excess material, which are not used for forming the layered cross-sectional element in the flat plate material member in the condition such that the formation state of the enclosed region is opened, performed between the steps of forming the layered cross-sectional element and leveling the vertical upper direction side surface of the layered member. In this case, prior to level the cross-sectional element, the material not used for forming the cross-sectional element, the compressed powder portion, is removed; and this prevents machining dust of the compressed powders from remaining on the leveled surface. As a result, the flat plate shaped member is tightly arranged on the leveled surface of the element to unify the cross-sectional elements evenly.

Also, the layered manufacturing method of the present invention may further comprise the step of arranging the shape of a side surface of a recently formed cross-sectional element in the condition such that the formation state of the enclosed region is broken, at a point in time just before the initial surface leveling or immediately after thereof, and just before the layered surface leveling or immediately thereafter. In this case, the shape of the cross-sectional element formed after each cross-sectional element is formed and before the next one is formed, is precisely fitted to the designed cross-sectional element. Therefore, the object having a smooth contour may be precisely formed.

From the second aspect, the present invention is a layered manufacturing device for manufacturing a desired solid object, with a plurality of flat plate material members formed by compressing powder raw material as starting material, exhausting for depressurizing so as to attain a pressure difference between an inside and outside not less than 0.05 MPa. The invention is comprised of a stage device, having a stage for mounting the flat plate material members, capable of driving the stage three dimensionally; a transparent member to cover a surface of the stage device to form an enclosed region together with the stage surface, thereby a vertical upper surface of the enclosed region becomes an optical window; an exhaustion mechanism; a conveying means for conveying the plate material members towards the stage; laser light irradiation means for irradiating laser light from vertical upper direction through the optical window to a predetermined area on the flat plate members in order to locally heat and melt a specified area of the flat plate material members in a condition such that the enclosed region is formed, exhausting gas in the enclosed region through the exhausting mechanism; and surface leveling means for leveling the vertical upper direction surface of a cross-sectional surface formed by solidifying after irradiation of the laser light in the condition such that the formation state of the enclosed region is opened.

In the layered manufacturing device, the flat shaped members formed from the powder particles by compressing under the reduced pressure and the pressure difference between the outside and inside is not less than 0.05 MPa are used as the starting material. Firstly, the conveying unit conveys the first flat shaped member onto the stage of the stage unit. Subsequently, it conveys the transparent member so as to put on the stage surface to form the enclosed region; and then, the gas in the region is exhausted by using the exhausting system. Under these conditions, a specific area that corresponds to the designed cross-sectional shape of the flat shaped member is irradiated by using the laser light emitted from a laser irradiation means through the optical window made of the transparent member. The specific area is locally heated to melt the area by moving the stage, and then the melted area is hardened to form the initial cross-sectional element. Then, the vertical upper surface of the initial cross-sectional element is leveled by the leveling means after the enclosed region on the stage surface is opened. Thus, a layered position of the first flat shaped member is manufactured.

Next, the conveying means arranges the next flat plate shaped member on the manufactured part having the leveled vertical upper surface under the enclosed region of the stage surface is opened.

Subsequently, the enclosed region is formed on the stage surface, and the gas inside of the region is exhausted by the exhaust system. Under the exhaustion condition, a specific area that corresponds to the designed cross-sectional shape of the flat shaped member is irradiated by using the laser light emitted from a laser irradiation means through the optical window made of the transparent member. The specific area is locally heated to melt the area by moving the stage, and then the melted area is hardened to form the initial cross-sectional element. Then, the vertical upper surface of the initial cross-sectional element is leveled by the leveling means after the enclosed region on the stage surface is opened.

Afterward, the three dimensional shape of the interest is strongly formed by sequentially repeating the layering of the flat plate member as discussed above, forming the layering cross-sectional element, and leveling of the vertical upper surface of the flat plate shaped member having the cross-sectional element.

Specifically, with the layered manufacturing device of the present invention, it is possible to manufacture a desired solid object using the above-described layered manufacturing method of the present invention. Therefore, according to the layered manufacturing device of the present invention, it is possible to manufacture a solid body of high strength simply and quickly.

The layered manufacturing device of the present invention may further comprised a conveyer means for conveying the transparent member, wherein the transparent member is covered to be fixed on the stage surface when the enclosed region is formed, and the transparent member is removed from the stage surface when the formation state of the enclosed region is opened. In this case, the enclosed region may be formed on the stage or broken without hand operation.

The present invention may further comprise an excess material removing means for removing a material which is not used for forming the cross-sectional element under the condition that the formation state of the enclosed region is opened. In this case, prior to leveling the cross-sectional element, the material not used for forming the cross-sectional element, the compressed powder portion, is removed, and this prevents the machining dust of the compressed powders to remain on the leveled surface. As a result, the flat plate shaped member is tightly arranged on the leveled surface of the element to unify the cross-sectional elements evenly.

The present invention may further comprise a side surface arranging means for arranging a side surface of the cross-sectional element of which vertical upper surface is leveled in the condition such that the formation state of the enclosed region is opened. In this case, the shape of the cross-sectional element, formed after each cross-sectional element is formed and before the next one is formed, is precisely fitted to the designed cross-sectional element. Therefore, the object having a smooth contour may be precisely formed.

As has been described above, according to the layered manufacturing method of the present invention, there is the remarkable effect of it being able to manufacture a solid body of high strength simply and quickly.

Also, according to the layered manufacturing device of the present invention, there is the remarkable effect of it being able to manufacture a solid body of high strength simply and quickly.

DETAILED DESCRIPTION

One embodiment of the present invention will be described in the following description in reference to FIG. 1 to FIG. 14B.

<Structure>

Figure 1:
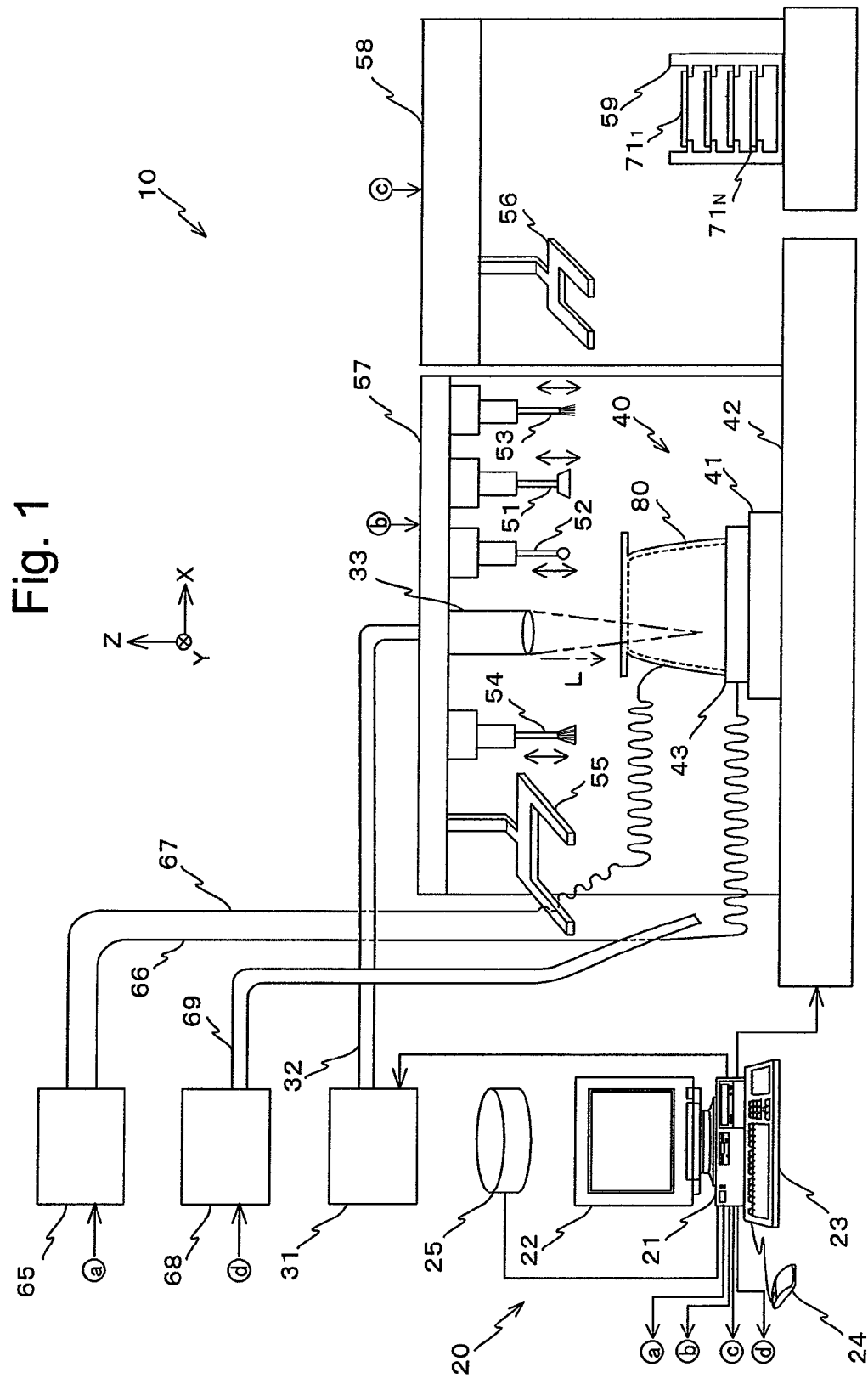
FIG. 1 is a drawing schematically showing the structure of a layered manufacturing device for using a layered manufacturing method of one embodiment of the present invention.

The schematic structure of a layered manufacturing device 10 of one embodiment of the present invention is shown in FIG. 1. As shown in FIG. 1, this layered manufacturing device 10 is comprised of (a) a computer system 20 for designing a desired solid object and storing design data, (b) a laser unit 31 controlled by the computer system 20 for generating laser light, (c) an irradiation optical system 33 for irradiating laser light radiated from the laser unit 31 via an optical fiber 32 to a flat plate material member $71_J$ (J=1 to N) mounted on a stage 41, which will be described later, and (d) a stage unit 40 controlled by the computer system 20 and having a stage 41 that can be moved in three axial directions of the X axis direction, the Y axis direction and the Z axis direction.

Here, the computer system 20 comprises (i) a processing unit 21 for executing various programs (such as, a solid object design program), and performing overall control of the layered manufacturing device 10, (ii) a display unit 22 for displaying graphics and text or the like in response to instructions of the processing unit 21, (iii) a stroke unit 23 (such as, a keyboard) for an operator to input instructions and character data for the processing unit 21, (iv) a pointing device 24 (such as, a mouse) for a user to designate positions on a display region of the display unit 22 for the processing unit 21, and (v) a storage unit 25 for storing data for a designed solid object etc.

Also, it is possible to suitably adopt a YAG laser generator that is capable of outputting a laser of peak power kw and pulse width of about 10 ms to a 0.5 mm flat plate material member as the laser unit 31, when the material powder is pure iron powder having an average particle diameter of 100 μm.

It also becomes possible for the irradiation optical system 33 to vary a focus position along the Z axis direction under control of the computer system 20.

The stage unit 40 comprises (i) the above described stage 41, and (ii) a drive unit 42 for driving the stage 41 in three directions along the XY and Z axes in response to command STC from the computer system 20 (in more detail, the processing unit 21). A base plate 43 having sufficient heat resistance is also mounted on the stage 41.

Figure 3:
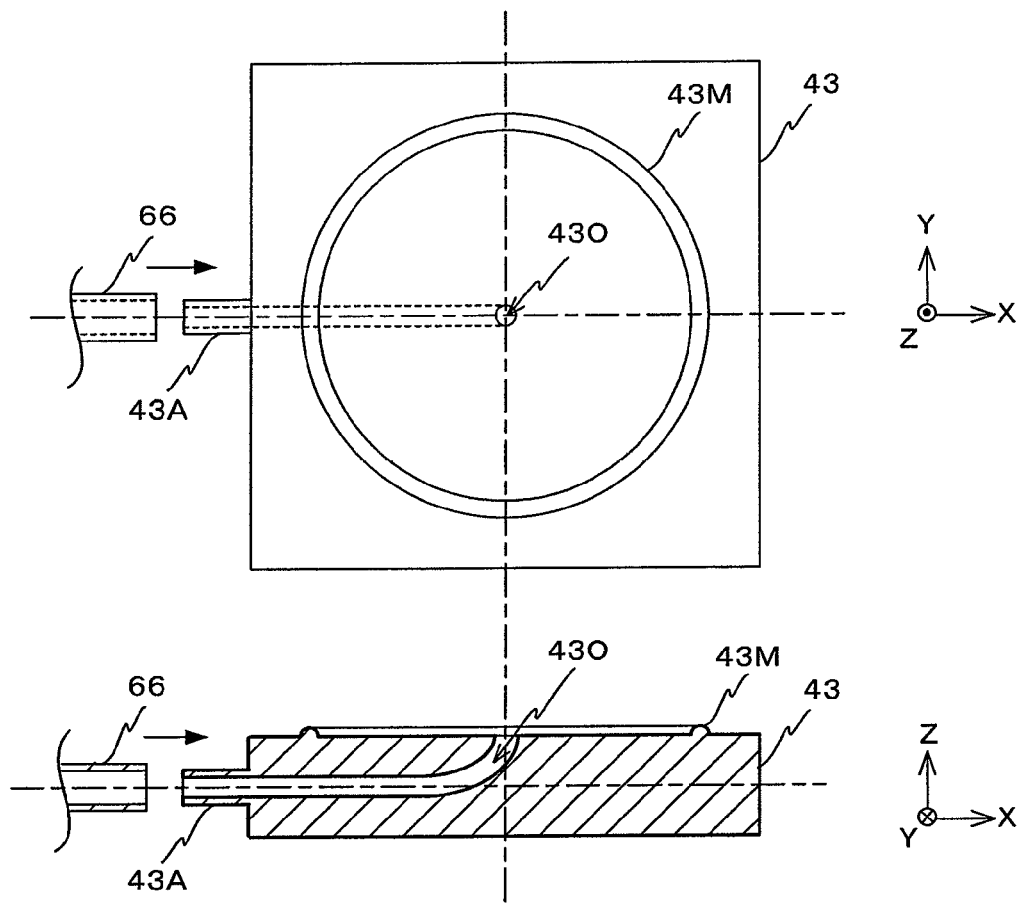
FIG. 3 is a drawing explaining the structure of a base plate.

As shown in FIG. 3, the base plate 43 is an almost quadrangular prism, and a cylindrical-shaped salient part 43M is formed on its +Z direction surface. Onto the salient part 43M, the transparent member 80 is placed as discussed below.

Alternatively, the base plate 43 has a flue part 43A to which a piping 66 is connected on the X-direction side surface thereof. The base plate 43 has a hole 43O that communicate the flow part 43A with the center part of the bottom surface in the +Z direction surface by the extension. Therefore, the air supplies the space of the upper part of the base plate 43 and exhaustion from the space can be performed via the piping 66 connected to the flue part 43A The layered manufacturing device 10 also comprises (e) a leveling tool 51 (such as, a grindstone), being controlled by the computer system 20, for leveling a +Z direction side surface of a member mounted on the stage 41 so as to be parallel to the XY surfaces, (f) an attrition tool 52 (such as, a ball end mill) controlled by the computer system 20, for grinding a surface of a member mounted on the stage 41 to shape with a finer precision than a layer step difference, and (g) an internal surplus material removal tool 53 (such as, a wire brush) controlled by the computer system 20 so as to remove surplus material on the stage 41. The layered manufacturing device 10 also comprises (h) a cleaning tool 54 (such as, a brush) for cleaning the salient part 43M on the base plate 43 and its periphery, (j) a robot arm 55 for moving the transparent member 80 hereinafter. These leveling tool 51, attrition tool 52, internal surplus material removal tool 53, cleaning tool 54 and robot arm 55, as well as the above described irradiation optical system 33, are attached to a base member 57.

The leveling tool 51, attrition tool 52, internal surplus material removal tool 53 and cleaning tool 54 are then respectively independently movable in the Z axis direction under the control of the computer system 20. The robot arm 55 is removable in the X, Y and Z axis directions under the control of the computer system 20.

In this specification, the term "attrition" is used with the same meaning as cutting.

The layered manufacturing device 10 also comprises (k) a conveying unit 58 having a robot arm 55. This robot arm 55 is capable of rotation in the three axial directions X, Y and Z, and rotation around the Z axis, under control of the computer system 20. Under control of the computer system 20, the robot arm 55 sequentially loads flat plate material members $71_1, 71_2, \ldots 71_N$ housed in the material member housing unit 59 onto the stage 41.

Figure 4:
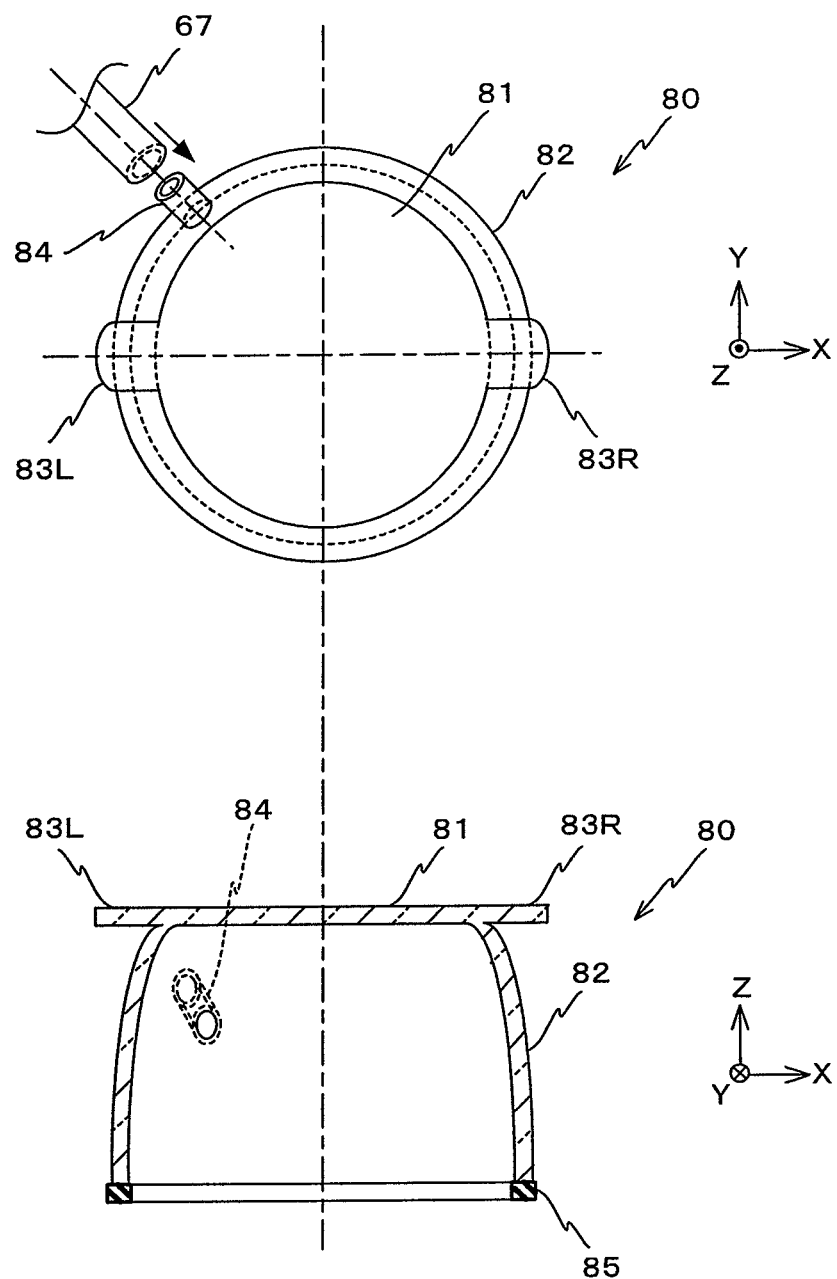
FIG. 4 is a drawing explaining the structure of a transparent member.

Furthermore, the layer laminating device 10 comprises (m) a transparent member 80 to cover the flat plate material member $71_j$ placed on the +Z direction of the base plate 43, and forms the enclosed region for housing the flat plate material member $71_j$ with the base plate 43, when the flat plate material member $71_j$ is irradiated by the laser light. The transparent member 80 has almost cylindrical shape as shown in FIG. 4, having a flat superior surface 81 (it is referred to as an "optical window" hereinbelow) and a side piece 82. The transparent member 80 has a flange part 83L, extending to −X direction, at the −X direction of the optical window 81. Also, the transparent member 80 has another flange part 83R, extending to +X direction, at the +X direction of the optical window 81. By utilizing the flange part 83L and 83R, the transparent member 80 is moved or pressed to the base plate 43 with the robot arm 55 as explained above.

The transparent member 80 has an exhaustion part 84 to which the piping 67 as explained below is connected in the side piece 82. Since the inside space is communicated with the outside through piping 67 connected to the exhaustion part 84, the gases in the transparent member 80 are exhausted.

Figure 5:
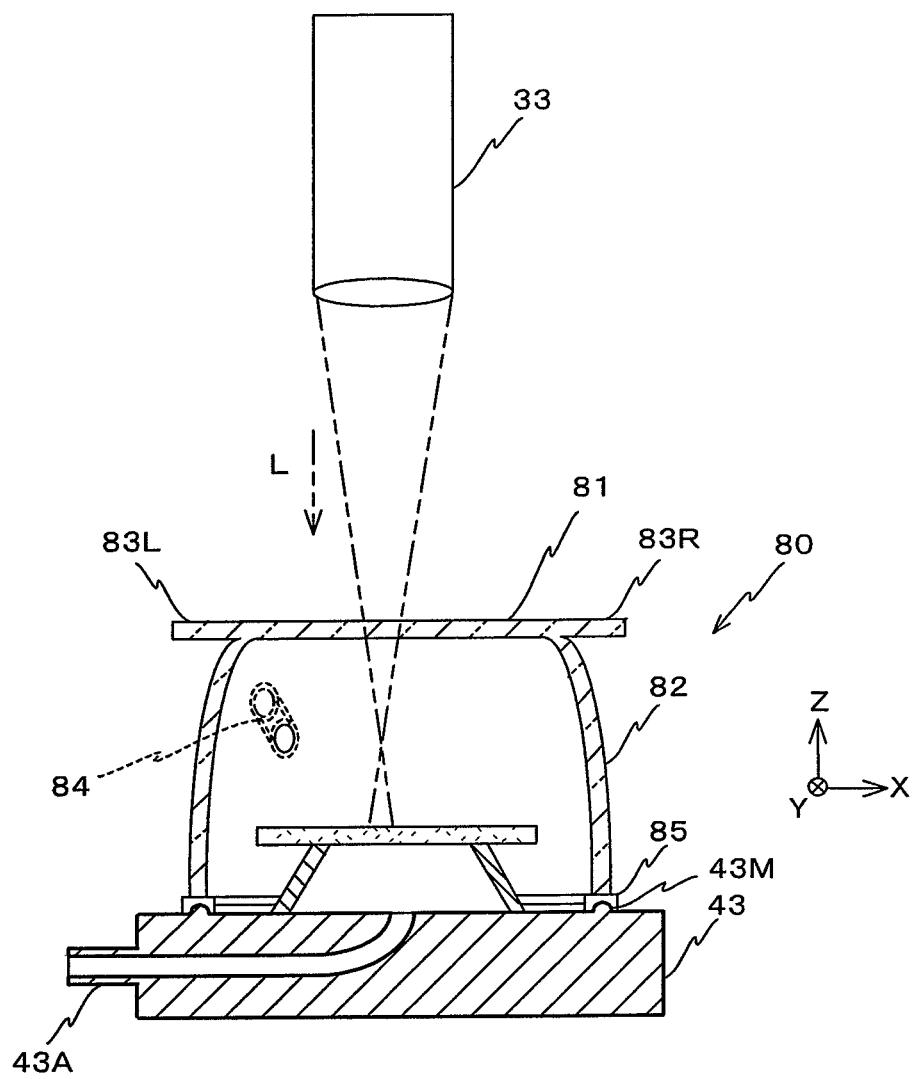
FIG. 5 is a drawing explaining an enclosed region formed by the base plate and the transparent member.
Figure 6A:
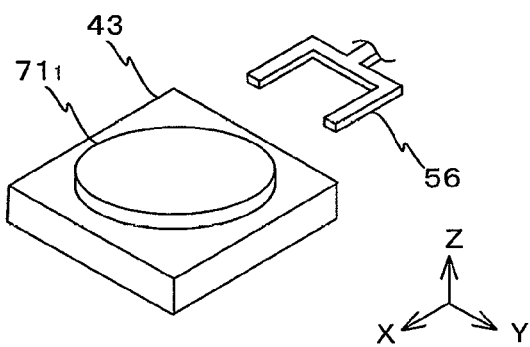
FIG. 6A is the first drawing for describing a step of a layered manufacturing method of one embodiment of the present invention.
Figure 6B:
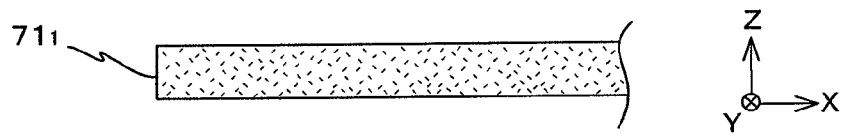
FIG. 6B is a drawing showing a cross-section of the flat plate material member $71_1$.

In the transparent member 80, a flexible member 85 (such as, rubber or the like) is attached to a −Z direction edge part of the side piece 82. The flexible member 85 is used to form an air tight enclosed region on a +Z direction of the base plate 43 by contacting to the salient part 43M of the base plate 43 as explained above. FIG. 5 shows the air tight enclosed region.

The enclosed region shown in FIG. 5 is formed before the irradiation of the laser light L to the flat plate material member $71_j$. In order to simplify the drawings, the transparent member 80 is not shown in FIGS. 8A and 12A as mentioned below, both of which show how laser light is irradiated.

The layered manufacturing device 10 comprises a forced flue device 65, which performs the air supply operation and exhaust operation through the piping 66 and/or piping 67 under the control of the computer system 20. Here, both of the piping 66 and/or piping 67 are made of flexible material and include coil form part therein. The coil form part is retractable so that it makes the piping 66 and 67 follow the movement in the X axis direction or the Y axis direction of the stage 41 possible. Also, it makes the piping 67 follow the movement of the transparent member 80 in the x-axis direction, Y axis direction and Z-axis direction by using the robot arm 55 possible.

The layered manufacturing device 10 also comprises a suction machine 68, and surplus material on the stage 41 can be sucked up through piping 69. Here, a suction operation by the suction machine 68 can be controlled by the computer system 20.

Incidentally, the flat plate material members $71_1, 71_2, \ldots, 71_N$ are formed by compressing material powder under the circumstance wherein reduction exhaustion is performed so as to the pressure difference between inside and the outside is not less than 0.05 MPa. Here, the flat plate material members $71_1, 71_2, \ldots, 71_N$ are not broken up by their own weight or by being loaded onto the stage 41 using the robot arm 56, and powder material is compressed to such an extent that material powder is not scattered as a result of irradiation of laser light L. For example, in the case of a material powder of pure iron powder having an average particle diameter of 100 μm, by compressing at 100 MPa or greater to give a proportion of material powder itself in respective flat plate material members $71_1, 71_2, \ldots, 71_N$ of 50% or greater, there is no breaking up due to their own weight or being loaded onto the stage 41 using the robot arm 56, and powder material is not scattered as a result of irradiation of laser light L. Furthermore, the amount of air included in the respective flat plate material members $71_1, 71_2, \ldots 71_N$ is greatly reduced compared to those, in which the material powders are compressed under high pressure under ordinary pressure, about 1 atm, to form the flat plate material member.

Thickness of a flat plate material member $71_j$ (j=1 to N) is determined to an appropriate value according to the type of material powder and power of laser light L.

An appropriate value of thickness for a flat plate material member $71_j$ according to power of laser light L is determined by experimentation beforehand, etc.

[Operation]

Next, a description will be given for the layered manufacturing operation using the layered manufacturing system having the above described structure.

As a pre-requisite, the flat plate material members $71_1$, $71_2$, ..., $71_N$ are already formed, and housed in the material member housing section 59. Also, the material member housing section 59 housing the flat plate material members $71_1$, $71_2$, ..., $71_N$ is placed at a specified position. Also, the salient part 43M in the base plate 43 and its surrounding area are swept.

Figure 2:
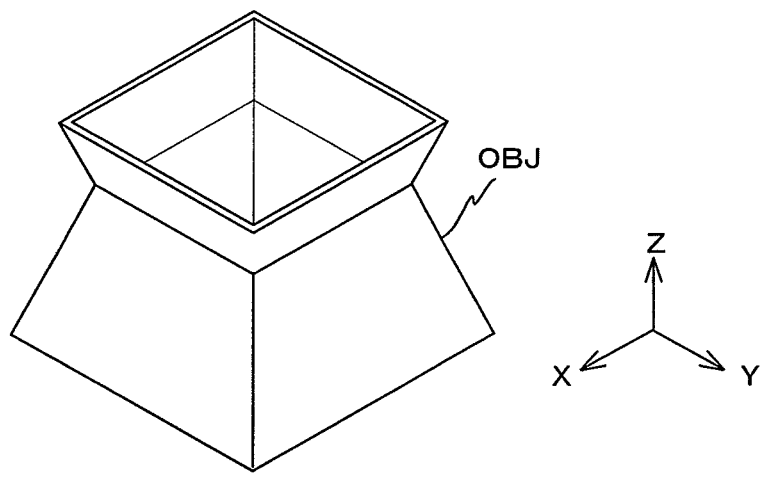
FIG. 2 is a drawing for describing the shape of a solid object to be manufactured.

First of all, a designer designs a desired solid object using the computer system 20. A particular design operation is carried by the user operating the stroke unit 23 and pointing device 24 while referring to display of the display unit 22, out in a state where a three dimensional CAD program has been executed by the processing section. Data of the solid object designed in this way, and cross-sectional shape data for each slice when the solid object is sliced at a horizontal surface (plane parallel to the XY surface) and to a specified thickness in the vertical direction (Z direction) are stored in the storage unit 25. Incidentally, as shown in FIG. 2, the designed solid object has a varied length of square along the Z direction, which shows an XY cross-section of solid object OBJ.

Once CAD design as described above is completed, the computer system 20 controls the drive unit 42 to transfer the stage 41 so as to position in a range wherein the robot arm of the conveying unit 58 is movable under the condition that the enclosed region is not formed on the base plate 43 (i.e., the transparent member 80 is apart from the base plate 43). Continuing on, the computer system 20 controls the conveying unit 58 to withdraw a flat plate material member $71_1$ from the material member housing unit 59, and loads the flat plate material member $71_1$ on to the base plate 43 on the surface of the stage 41 (refer to FIG. 6A). The flat plate material member $71_1$ in this state is entirely flat, as shown representatively by the XZ cross-section shown in FIG. 6B.

Next, the computer system 20 controls the drive unit 42 to move the stage 41 so that the stage 41 is placed at a −Z direction side of the irradiation optical system 33. Subsequently, the computer system 20 controls the robot arm 55 to place the transparent member 80 on the salient portion of the base plate 43 so that the flat plate material member $71_1$ is housed in an enclosed region composed of the base plate 43 and the transparent member 80.

Next, the computer system 20 controls the forced flue device 65 to exhaust the gas inside of the enclosed region formed as discussed above so as to make the pressure inside of the enclosed region lower than that of outside. In this embodiment, the pressure difference is not less than 0.05 MPa. At this stage, since there is almost no gap between the base plate 43 and the flat plate material member $71_1$, the computer system 20 allows the forced flue device 65 to perform only the control of the exhaustion operation through the piping 67.

When the exhaustion operation begins, the computer system 20 controls the robot arm 55 to push the flange parts 83L and 83R of the transparent member 80 from +Z direction to −Z direction to press the transparent member onto the base plate 43. When the pressure in the enclosed region is then decreased to enlarge the pressuring force caused by the pressure difference between the inside and the outside of the enclosed regions that presses the transparent member onto the base plate 43, the computer system 20 makes the robot arm 55 become released from the transparent member.

Next, the computer system 20 controls the drive unit 42 to move the stage 41 so that the stage 41 is placed at a −Z direction side of the irradiation optical system 33. Continuing on, the computer system 20 controls the drive unit 42 to move the stage 41 in the Z axis direction so that a Z axis position of a +Z direction side surface of the flat plate material member $71_1$ approaches a focal plane of the irradiated light L projected from the irradiation optical system 33. Incidentally, when the stage 41 is moving in the Z axis direction, the +Z direction side surface of the flat plate material member $71_1$ is moved so as to have a specified defocus amount with respect to the irradiated light L. This specified defocus amount is determined by prior experimentation etc.

Next, continuing the exhaustion operation by using the forced flue device 65, the computer system 20 controls the drive unit 42 to move the stage 41 in parallel with XY plane. While moving, the computer system 20 controls the laser unit 31 to irradiate the region corresponding to the designed cross-section on the flat plate material member $71_1$ to the irradiation light L, which is from the +Z direction (upper vertical direction) side through the optical window 81 made of the transparent member 80, for local heating. Since the heating is performed under the circumstances that decompression operation is being performed, the material degradation caused by the oxidation or the like is suppressed, and contamination of the atmosphere gas (such as, air or the like) into the material caused by ruffling the melted surface is also suppressed.

Figure 7A:
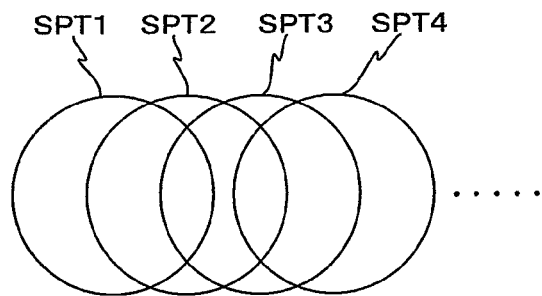
FIG. 7A is a drawing for describing an irradiation method for irradiated light.
Figure 7B:
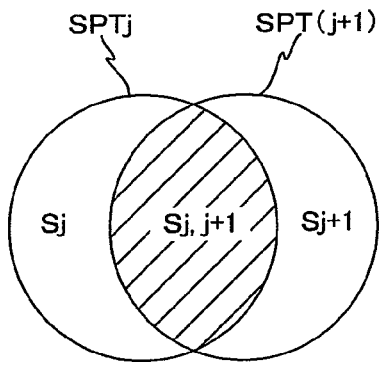
FIG. 7B is a drawing for describing an overlap ratio of irradiation spots in FIG. 7A.

Localized heating by the irradiated light L is carried out by adjusting a pulse gap and an amount of stage movement so that each spot shaped irradiation region SPT1, SPT2, ... formed by the irradiated light (pulse light) on the +Z direction side surface of the flat plate material member $71_1$ overlaps the next irradiation region SPT2, SPT3, ..., as shown in FIG. 7A. Incidentally, it is preferable that an overlapping surface area $S_{j,j+1}$ of the irradiation region SPTj and the next irradiation region SPT(j+1) shown in FIG. 7B is larger than 50% or more of the surface area of the irradiation region SPTj ($=S_j+S_{j,J+1}$) for forming a solid object with high strength. In doing this, it is possible to form a high strength solid object with the same strength as is achieved with the conventional two step laser light irradiation.

Figure 8A:
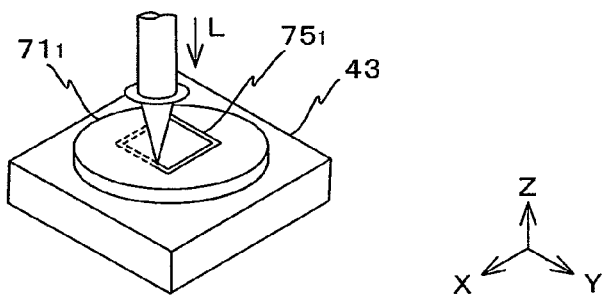
FIG. 8A is the second drawing for describing a step of a layered manufacturing method of one embodiment of the present invention.

As a result of irradiation of irradiated light L in this manner, a cross-section element $75_1$ of the first layer is formed (refer to FIG. 8A). Incidentally, when forming the cross-section element $75_1$ of the first layer, the cross-section element $75_1$ of the first layer is temporarily fixed to the base plate 43. This temporary fixing is achieved by slightly weakening the power of irradiated light L compared to at the time of formation of the cross-sectional elements for the second and subsequent layers, as will be described later.

Figure 8B:
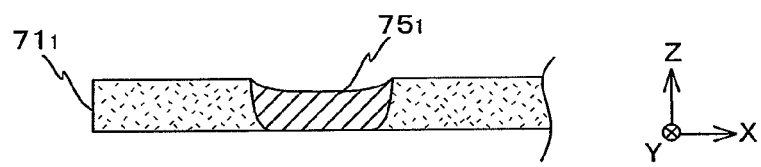
FIG. 8B is a drawing showing a cross-section of the flat plate material member $71_1$ and a cross-sectional element $75_1$ of FIG. 8A.

An XZ cross-section of the flat plate material member $71_1$ for a section extending along the Y-axis direction of the cross-sectional element $75_1$ formed in this way is shown in FIG. 8B. As representatively shown in FIG. 8B, this cross-sectional element $75_1$ is such that a boundary section between a region irradiated with irradiated light L and a region that has not been irradiated is shaped like a truncated crescent moon. Also, a Z-axis direction position of a +Z direction side surface of a central part of the cross-sectional element $75_1$ is offset more to the −Z direction than the Z-axis direction position of a +Z direction side surface of the flat plate material member $71_1$ before irradiation.

Next, the computer system 20 controls the drive unit 42 to move the stage 41 so that the stage 41 is placed at a −Z direction side of the movable range of the robot arm 55. Continuing on, the computer system 20 controls the forced fuel unit 65 to charge gas into the enclosed region formed by the base plate 43 and the transparent member 80 to eliminate the pressure difference between inside and outside of the enclosed region. Continuing on, the computer system 20 controls the robot arm 55 so as to release the transparent member 80 from the base plate 43.

Next, surplus material sections of the flat plate material member $71_1$ other than the cross-sectional element $75_1$ are removed. When removing the surplus material sections, the computer system 20 mechanically lops off the surplus material sections using the leveling tool 51 and the internal surplus material removal tool 53 while appropriately moving the stage 41. Suction removal is then performed using the suction unit 68. During such removing operation of surplus material part, in order to prevent of dropping the surplus material into the communicated hole 430, the computer 20 controls the forced flue device 65 to perform charging operation through the piping 66.

When the removing is performed mechanically, the surplus material is scraped out by using the surplus material remover 53 in the enclosed region formed by the cross-sectional element $75_1$.

Next, the computer system 20 controls the drive unit 42 to move the stage 41 so that the stage 41 is at a $-Z$ direction side of the leveling tool 51. Subsequently, the computer system 20 controls the drive unit 42 and the leveling tool 51 so as to position a $+Z$ direction side surface of the cross-sectional element $76_2$ close to the grinding member of the attrition tool 52.

Figure 9A:
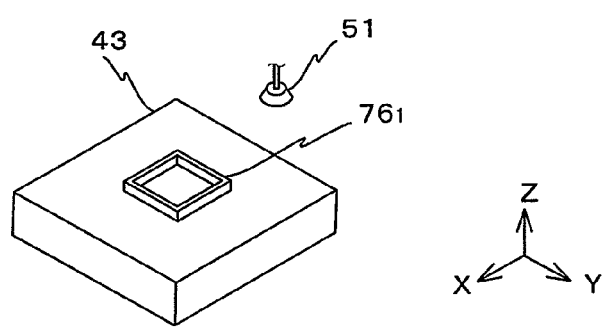
FIG. 9A is the third drawing for describing a step of a layered manufacturing method of one embodiment of the present invention.
Figure 9B:
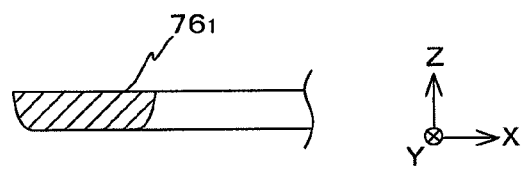
FIG. 9B is a drawing showing a cross-section of the cross-sectional element $76_1$ of FIG. 9A.

After that, the computer system 20 controls the drive unit 42 and the leveling tool 51 to level the cross-sectional element $75_1$. As a result, the cross-sectional element $75_1$ is processed into the cross-sectional element $76_1$ having the leveled $+Z$ direction side surface (refer to FIG. 9A). During such leveling operation for the cross sectional element $75_1$, in order to prevent the dropping grinding dust into the communicated hole 430, the computer 20 controls the forced flue device 65 to perform charging operation through the piping 66. FIG. 9B shows the XZ cross-sectional plane of the part in which the cross sectional element $76_1$ extends along the Y-axis.

Next, the computer system 20 controls the drive unit 42 to move the stage 41 so that the stage 41 is placed at a $-Z$ direction side of the attrition tool 52. Continuing on, the computer system 20 controls the drive unit 42 and the leveling 51 to position a $+Z$ direction side surface of the cross-sectional element $76_1$ close to an attrition member of the attrition tool 52.

Figure 10A:
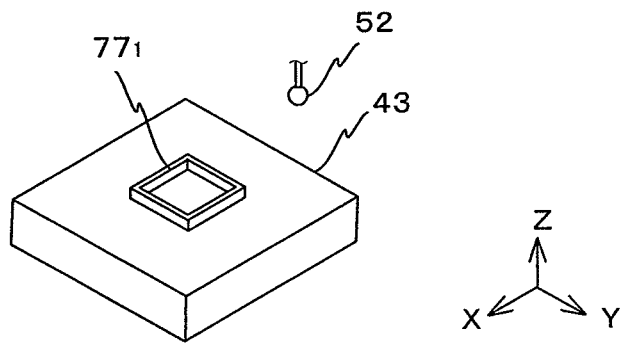
FIG. 10A is the fourth drawing for describing a step of a layered manufacturing method of one embodiment of the present invention.
Figure 10B:
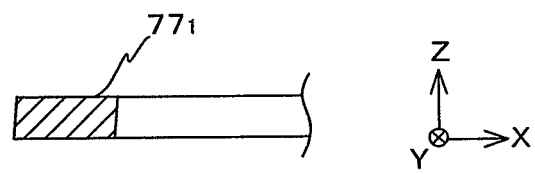
FIG. 10B is a drawing showing a cross-section of the cross-sectional element $77_1$ of FIG. 10A.

After that, the computer system 20 controls the drive unit and the attrition tool 52 to grind the side surface of the cross-sectional element $76_1$ to accurately conform to the designed shape. As a result, a shaped cross-sectional element $77_1$ with the cross-sectional element $76_1$ shaped is formed (refer to FIG. 10A). An XZ cross-section of a section of the formed cross-sectional element $77_1$ extending along the Y-axis direction is shown in FIG. 10B. The shaped cross-sectional element $77_1$ formed in this way constitutes a manufactured body of this stage.

Figure 11A:
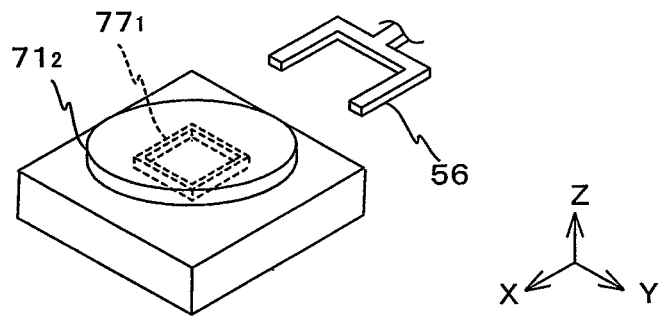
FIG. 11A is the fifth drawing for describing a step of a layered manufacturing method of one embodiment of the present invention.
Figure 11B:
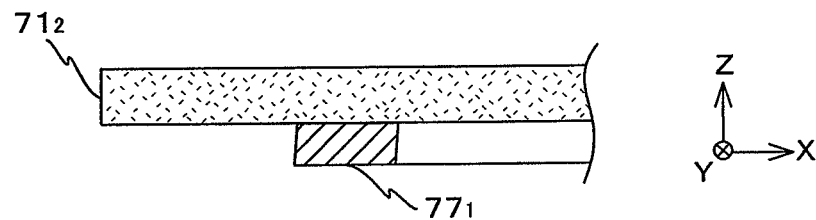
FIG. 11B is a drawing showing a cross-section of the flat plate material member $71_2$ and a cross-sectional element $77_1$ of FIG. 11A.

Next, the computer system 20 controls the drive unit 42 to move the stage 41 so that the stage 41 is placed within the movable range of the robot arm 55 of the conveying unit 58. Continuing on, the computer system 20 controls the conveying unit 58 to withdraw a flat plate material member $71_2$ from the material member housing unit 59, and loads the flat plate material member $71_2$ on to shaped cross-sectional member $77_1$ mounted on the base plate 43 (refer to FIG. 11A). An XZ cross-section of a section of the formed cross-sectional element $77_1$ in this state extending along the Y axis direction is shown in FIG. 11B. As shown in FIG. 11B, the flat plate material member $71_2$ is mounted on a $+Z$ direction side surface of the shaped cross-sectional member $77_1$, so as to be completely adhered.

Next, as similarly to the case of the flat plate material member $71_k$, the computer system 20 controls the drive unit 42 to move the stage 41 so that the stage 41 is placed at a $-Z$ direction side of the movable range of the robot arm 55. Subsequently, the computer system 20 controls the robot arm 55 to mount the transparent member 80 on the salient part 43M of the base plate 43 so that the flat plate material member $71_1$ is housed in an enclosed region formed with the base plate 43 and the transparent member 80. Continuing on, the computer system 20 controls the forced fuel unit 65 to perform the exhaustion operation from the enclosed region in a similar manner such that the flat plate material member $71_1$ is processed. At this stage, when the enclosed region is formed by the surface area including the periphery of the communicated hole 430 at the center of the base plate 43, the formed cross-sectional element $77_1$, and the flat plate material member $71_1$, the computer system 20 allows the forced flue device 65 to perform only the control of the exhaustion operation through the piping 66 in addition to the exhaustion operation through the piping 67.

Figure 12A:
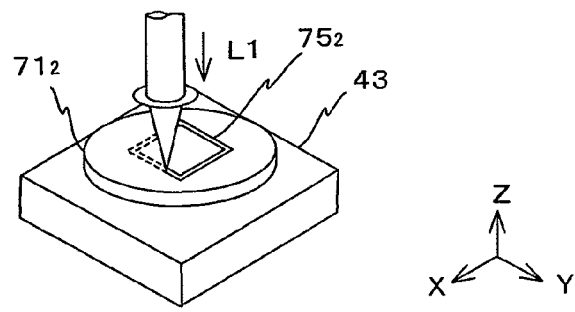
FIG. 12A is the sixth drawing for describing a step of a layered manufacturing method of one embodiment of the present invention.
Figure 12B:
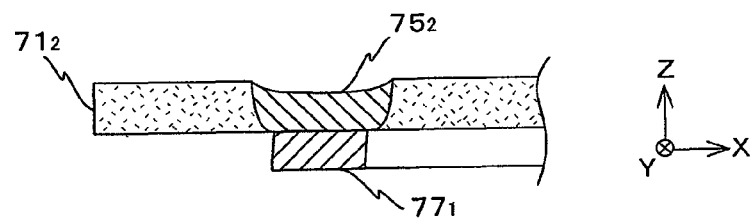
FIG. 12B is a drawing showing a cross-section of the cross sectional element $77_1$, flat plate material member $71_2$, and cross-sectional element $75_2$ of FIG. 12A.

Next, the computer system 20 controls the drive unit 42 to move the stage 41 so that the stage 41 is at a $-Z$ direction side of the irradiation optical system 33, and after that, moves the stage 41 in the Z axis direction so that a Z axis position of a Z direction side surface of the flat plate material member $71_2$ is close to the focal plane of irradiated light L irradiated from the irradiation optical system 33. Then, similarly to the case for the flat plate material member $71_1$, the computer system 20 controls the drive unit 42, and controls the laser unit 31 while the stage 41 is being moved parallel to the XY plane to carry out localized heating by irradiating irradiated light L of sufficient power to a region of the flat plate material member $71_2$ corresponding to the designed cross-sectional shape, similar to the case of the flat plate material member $71_1$. As a result, the second layer cross-sectional element $75_2$, an essential member, integral to the shaped cross-sectional member $77_1$ is formed (refer to FIG. 12A). XZ cross-sections of the flat plate material member $71_1$ and the cross-sectional element $75_2$ are shown in FIG. 12B, wherein both members extend along the Y-axis direction of the cross-sectional element $75_2$ formed in this way. As representatively shown in FIG. 12B, this cross-sectional element $75_2$ is such that a boundary section between a region irradiated with irradiated light L and a region that has not been irradiated is shaped like a truncated crescent moon, similarly to the case for the cross-sectional element $75_1$ described above. Also, a Z-axis direction position of a $+Z$ direction side surface of a central part of the cross-sectional element $75_2$ is offset more to the $-Z$ direction than the Z-axis direction position of a $+Z$ direction side surface of the flat plate material member $71_2$ before irradiation.

Next, similar to the case of the flat plate member $71_1$, the computer system 20 controls the drive unit 42 to move the stage 41 so that the stage 41 is placed at a $-Z$ direction side of the movable range of the robot arm 55. Continuing on, the computer system 20 controls the forced fuel unit 65 to charge gas into the enclosed region formed by the base plate 43 and the transparent member 80 to eliminate the pressure difference between the inside and the outside of the enclosed region. Continuing on, the computer system 20 controls the robot arm 55 so as to release the transparent member 80 from the base plate 43.

Next, surplus material sections of the flat plate material member $71_2$ other than the cross-sectional element $75_2$ are removed. When removing the surplus material sections, the computer system 20 mechanically lops off the surplus material sections using the leveling tool 51 and the internal surplus material removal tool 53 while appropriately moving the stage 41. Suction removal is then performed using the suction unit 68. Continuing on, similar to the case for the cross-sectional member $75_1$, the computer system controls the drive unit 42 to move the stage 41 so that the stage 41 is at a −Z direction side of the leveling tool 51. After that, the computer system 20 controls the drive unit 42 and the leveling tool 51 so as to position a +Z direction side surface of the cross-sectional element $75_2$ close to the grinding member of the leveling tool 51.

Figure 13A:
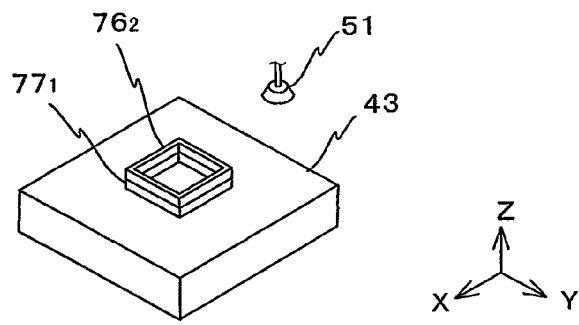
FIG. 13A is the seventh drawing for describing a step of a layered manufacturing method of one embodiment of the present invention.
Figure 13B:
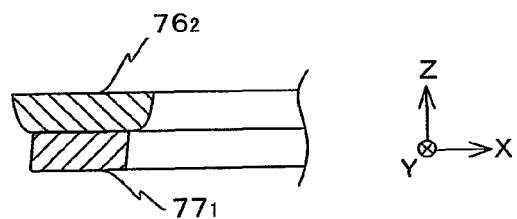
FIG. 13B is a drawing showing a cross-section of the cross-sectional element $77_1$ and cross-sectional element $76_2$ of FIG. 13A.

Then, similarly to the case for the cross-sectional element $75_1$, the computer system 20 controls the drive unit 42 and the leveling tool 51 to level a +Z direction side surface of the cross-sectional element $75_2$. As a result, the cross-sectional element $75_2$ is processed into the cross-sectional element $76_2$ having the +Z direction side surface leveled (refer to FIG. 13A). An XZ cross-section of a section of the cross-sectional element $76_2$ formed in this way extending along the Y-axis direction is shown in FIG. 13B.

Figure 14A:
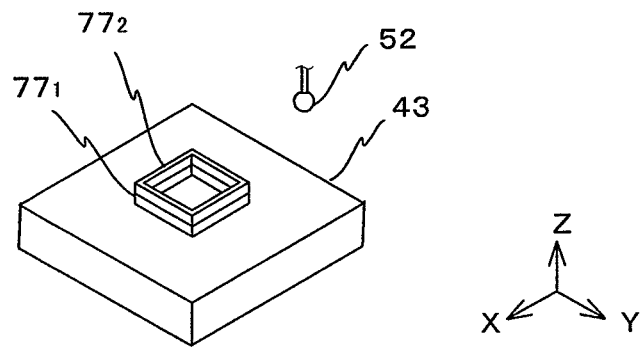
FIG. 14A is the eighth drawing for describing a step of a layered manufacturing method of one embodiment of the present invention.
Figure 14B:
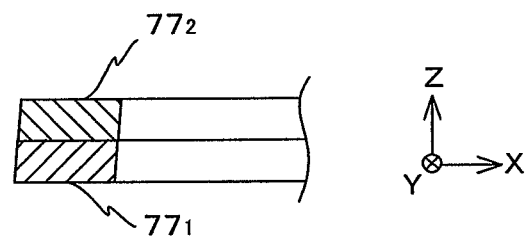
FIG. 14B is a drawing showing a cross-section of the cross-sectional element $77_1$ and cross-sectional element $77_2$ of FIG. 14A.

Next, similar to the case for the flat plate material member $71_1$, the computer system controls the drive unit 42 to move the stage 41 so that the stage 41 is at a −Z direction side of the attrition tool 52. After that, the computer system 20 controls the drive unit 42 and the leveling tool 51 so as to position a +Z direction side surface of the cross-sectional element $76_2$ close to the grinding member of the attrition tool 52. Then, similar to the case for the flat plate material member $71_1$, the computer system 20 controls the drive unit 42 and the attrition tool 52 to grind the side surface of the cross-sectional element $76_2$ to accurately conform with the designed shape. As a result, a shaped cross-sectional element $77_2$ with the cross-sectional element $76_2$ shaped is formed (refer to FIG. 14A). An XZ cross-section of a section of the formed cross-sectional element $77_2$ extending along the Y-axis direction is shown in FIG. 14B. The shaped cross-sectional element $77_1$ and the shaped cross-sectional element $77_2$ formed in this way are integrated, constituting a manufactured body of this stage.

When the formed cross-sectional element $77_2$ is formed, similar to the operations for removing the surplus material parts except the cross-sectional element $75_2$ in the flat plate material member $71_2$, leveling the +Z direction side surface of the cross-sectional element $75_2$, and forming the formed cross-sectional element $77_1$ are performed, in order to prevent the dropping of grinding dust into the communicated hole 430, the computer 20 controlling the forced flue device 65 to perform charging operation through the piping 66.

After that, similar to layered manufacturing for the second layer described above, layered manufacturing for the third and subsequent layers is carried out. Then, finally, the desired solid object OBJ is formed with high strength and high accuracy.

As explained above, the flat plate material members $71_1$ to $71_N$ are prepared by compressing the material powder, performing the exhaustion for decompression so that the pressure difference between the inside and the outside is not less than 0.05 MPa. The first flat plate material member $71_1$ is then mounted on the predetermined position at the position on the base plate 43 to put on the transparent member 80 on the base plate; namely, to form the enclosed region, wherein the predetermined position is inside of the enclosed region that is formed. After that, the transparent member 80 is put on the base plate 43 to form the enclosed region; and then, the exhaustion operation that exhaust the gas in the enclosed region by the forced flue device 65 is started.

Next, continuing the exhaustion operation by the forced flue device 65 from the enclosed region, the irradiation light (laser light) L is irradiated onto the designed cross-sectional region on the first flat plate material member $71_1$ from the upper vertical direction through the optical window 81 of the transparent member 80. Subsequently, after opening of the enclosed region, the surface of the initial cross-sectional element $75_1$ is leveled.

Next, subsequent flat plate material member $71_k$ (k=2 to N) is arranged on the formed element having leveled upper vertical surface, wherein the formed element is located at the position that is inside of the enclosed region after it is formed. As a result, a new plate material member is placed on the surface of the formed element so as to be almost closely-attached. After that, the transparent member 80 is put on the base plate 43 to form the enclosed region; and then, the exhaustion operation by the forced flue device 65 is started.

Next, continuing the exhaustion operation by the forced flue device 65 from the enclosed region, the irradiation light L is irradiated onto the designed cross-sectional region on the flat plate material member $71_k$ from the upper vertical direction through the optical window 81 of the transparent member 80. By this, the flat plate material member $71_k$ is locally heated and melted; and then, it is solidified to form the initial cross-sectional element $75_k$. Subsequently, after opening of the enclosed region, the surface of the initial cross-sectional element $75_k$ is leveled.

After that, a desired solid body having high strength is formed by sequentially repeating the above described flat plate material member layering, layered cross-sectional element formation and layered surface leveling.

Therefore, according to this embodiment, it is possible to manufacture a solid body of high strength simply and quickly.

Also with this embodiment, for the flat plate material members $71_1$ to $71_N$, the volume occupied by material is larger than the volume occupied by space; that is, the proportion of material powder is greater than 50%. For this reason, the flat plate material members $71_1$ to $71_N$ are not broken up by their own weight or being loaded onto a stage using a robot arm and so forth; and it is possible to compress powder material to such an extent that material powder is not scattered as a result of irradiation of irradiation light (laser light).

Also with this embodiment, after forming a cross-sectional members $75_j$ (j=1 to N), sections of the flat plate material member $75_j$ other than the cross-sectional member $75_j$ are removed, followed by leveling of the surface of the cross-sectional member $75_j$. It is therefore possible to prevent chips of compressed material remaining on the surface after leveling. As a result, it is possible to reliably arrange the next flat plate member on the leveled surface without any gaps.

Also, with this embodiment, since the initially formed cross-sectional members $75_1$, $75_2$, . . . also have respective side surfaces shaped when they are formed, it is possible to make the manufactured result conform to the designed shape with good precision.

Modification of the Invention

The present invention is not limited to the above-mentioned embodiment and can be modified.

As a material of the flat plate material members, it is possible, besides the above described pure iron powder, to use a metal powder such as titanium, an alloy powder such as Ni—Mo alloy steel (for example, KIP Sigmalloy 415 (trade name) manufactured by Kawasaki Steel Ltd.), polyamide type plastic powder such as nylon, ceramics powder such as zirconia, or glass powder such as soda glass; and it is possible to similarly perform layered manufacturing.

Here, it is necessary to appropriately select the type of laser used for heating in accordance with the material used. For example, even if the material is other than powdered pure iron, if it is a powder of metal or alloy, it is possible to adopt a YAG laser. Also, if the material is powder of metal such as pure iron, or of an alloy, it is also possible to adopt a carbon dioxide laser or a semiconductor laser. Also, with respect to each of the above types of resin or glass, it is possible to adopt a carbon dioxide laser, or for the above-described ceramics, it is possible to adopt a YAG laser or a carbon dioxide laser. It is also possible to be a semiconductor laser or YAG laser can be used by mixing an absorbent such as carbon into the resin.

In the above-mentioned embodiment, the transparent member except the flexible member is almost transparent. However, it is enough that the optical window is transparent, and there are characteristics for other parts whether they are transparent or not.

Also with the above described embodiment, adjustment of a Z-axis direction positional relationship between the flat plate material members and the focal plane can be carried out by moving the stage 41 in the Z-axis direction. In contrast, it is also possible to adjust the focal position of the irradiation optical system 33 by moving the irradiation optical system.

Also with the above-described embodiment, the material of all the flat plate material members $71_1$ to $71_N$ are the same, but it is also possible for respective materials of the flat plate material members to be determined according to respective layer positions of the flat plate material members. In this case, it is possible to manufacture a layer manufactured body with a material having a desired strength according to a position of the layer manufactured body in a layer direction.

Figure 15A:
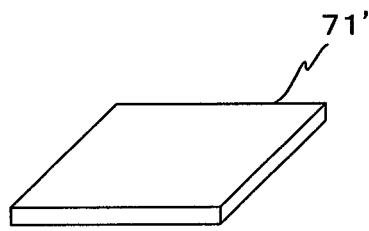
FIG. 15A is a drawing for describing a first modified example.
Figure 15B:
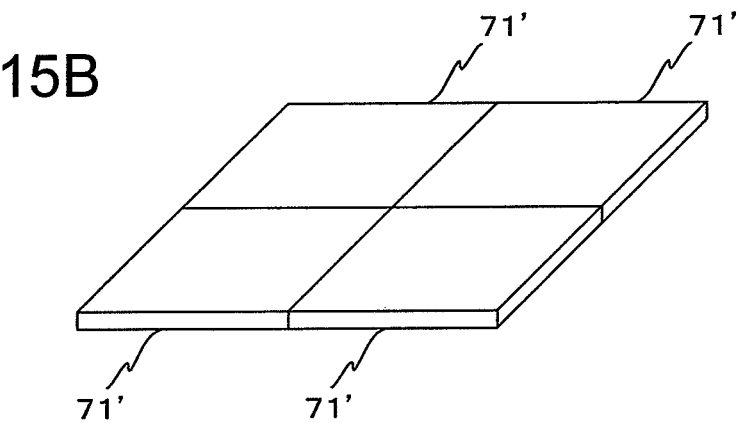
FIG. 15B is a drawing for describing a second modified example.

Also with the above-described embodiment, the shape of all the flat plate material members $71_1$ to $71_N$ is circular, but it is also possible to use a rectangular flat plate material member 71' such as that shown in FIG. 15A. Further, as shown in FIG. 15B, it is possible to perform layered manufacturing for a large object by making up a material member of a single layer with a multiple array of flat plate material members 71'.

Alternatively, in the above-mentioned embodiment, the exhaustion is performed so that the pressure inside of the enclosed region when the laser is irradiated and outside is not less than 0.05 MPa the same as that for the case for forming the flat plate shaped member $71_1$ to $71_N$. However, the pressure difference may be lower.

Also, with the above-described embodiment, a suction unit 68 has been used, but it is also possible to blow away surplus material sections using an air blower.

It is also possible to carry out shaping of side surface of the cross-sectional elements prior to leveling of the cross-sectional elements.

Also, in the above-mentioned embodiment, the laser light is irradiated under the reduced atmosphere. In contrast, on the operation for reducing the pressure after the enclosed space is formed, it may be carried out by exhausting non-oxygenating gasses such as Ar being replaced or replacing the air in the space.

Also, the shape of the solid object that is the object of layered manufacturing is not limited to the solid object OBJ of the above-described embodiment, and it possible to have any shape.

As has been described above, a layered manufacturing method and layered manufacturing device of the present invention has powder as a material, and can be adopted in layered manufacturing for making a desired three-dimensional object.

What is claimed is:

1. A layered manufacturing method for forming a desired three-dimensional object by using a powder as a raw material, with powder as a raw material, for forming a desired solid body, which is employed in a layered manufacturing device including a stage member having stage surface; a transparent member having an optical window to cover said stage surface to form an enclosed region together with said stage surface, wherein said optical window is positioned at a vertical upper direction when said enclosed region is formed; and an exhaust system for exhausting gasses in said enclosed region, comprising the steps of:

preparing a plurality of flat plate material members formed by compressing material powder, exhausting said gasses for reducing a pressure so as to produce a pressure difference between an inside and an outside of said enclosed region of at least 0.05 MPa;

placing a first flat plate material member at a position on a stage surface before said enclosed region is formed, the position of which is to stay inside said enclosed region after it is formed;

irradiating laser light through said optical window made of said transparent member from said vertical upper direction to a region of an initial one of the flat plate material members to form an initial cross-sectional element that is hardened after locally heating and melting;

leveling said vertical upper direction side surface of said initial cross-sectional element in a condition that said enclosed region is opened; and subsequently, placing said flat plate material member as a layered material member at the position on the stage surface before said enclosed region is formed, the position of which is to stay inside said enclosed region after it is formed;

irradiating laser light through the optical window of the transparent material member from the vertical upper direction to a region of the flat plate material member corresponding to a designed cross-sectional shape of a layered position of the flat plate material member of a desired solid object to form a layered cross-sectional element that is hardened after locally heating and melting, together with the integration of the vertical upper direction side with a part already formed on an opposite side; and leveling said vertical upper direction side surface of the initial cross-sectional element in the condition that said enclosed region is opened.

2. The layered manufacturing method of claim 1, wherein the porosity of the member is 50%.

3. The layered manufacturing method of claim 1, wherein the material powder is a powder of metal or alloy.

4. The layered manufacturing method of claim 1, wherein respective materials of the flat plate material members are determined in accordance with respective layer positions of the flat plate material members.

5. The layered manufacturing method of claim 1, further comprising the steps of:

removing first excess material, which are not used for forming said first initial cross-sectional element in a condition such that a formation state of said enclosed region is broken, being performed between the steps of forming said initial cross-sectional element and leveling said vertical upper direction side surface; and removing layered excess material, which are not used for forming said layered cross-sectional element in said flat plate material member in said condition such that a formation state of said enclosed region is broken, being performed between the steps of forming said layered cross-sectional element and leveling said vertical upper direction side surface of said layered member.

6. The layered manufacturing method of claim 1, further comprising the step of arranging a shape of a side surface of a recently formed cross-sectional element in said condition such that a formation state of said enclosed region is open, at a time period just before said initial surface leveling or immediately after thereof, and just before said layered surface leveling or immediately after thereof.

7. A layered manufacturing device, for manufacturing a desired solid object, with a plurality of flat plate material members formed by compressing powder raw material as starting material, exhausting for depressurizing to a pressure difference between an inside and outside of at least 0.05 MPa, the device comprising:
- a stage device, having a stage for mounting the flat plate material members, capable of driving the stage three-dimensionally;
- a transparent member to cover a surface of said stage device to form an enclosed region together with said stage surface, a vertical upper surface of said enclosed region thereby becoming optical window;
- an exhaustion mechanism for exhausting gasses inside of said enclosed region;
- a conveying means for conveying the plate material members towards the stage;
- laser light irradiation part configured to irradiate laser light from a vertical upper direction through said optical window to a predetermined area on said flat plate material members in order to locally heat and melt a specified area of the flat plate material members in a condition such that said enclosed region is formed, thereby exhausting gasses in said enclosed region through said exhausting mechanism; and
- surface leveling part configured to level said vertical upper direction surface of a cross-sectional surface formed by solidification after irradiation of said laser light in the condition such that the formation state of said enclosed region is open.

8. The layered manufacturing device of claim 7, further comprising a conveyer part configured to convey said transparent member, wherein said transparent member is covered to be fixed on said stage surface when said enclosed region is formed, and said transparent member is removed from said stage surface when said formation state of said enclosed region is open.

9. The layered manufacturing device of claim 7, further comprising an excess material removing part configured to remove a material which is not used for forming said cross-sectional element in the condition such that the formation state of said enclosed region is open.

10. The layered manufacturing device of claim 7, further comprising a side surface arranging part configured, to arrange a side surface of said cross-sectional element of which a vertical upper surface is leveled in the condition such that the formation state of said enclosed region is open.

* * * * *